Patented Feb. 11, 1936

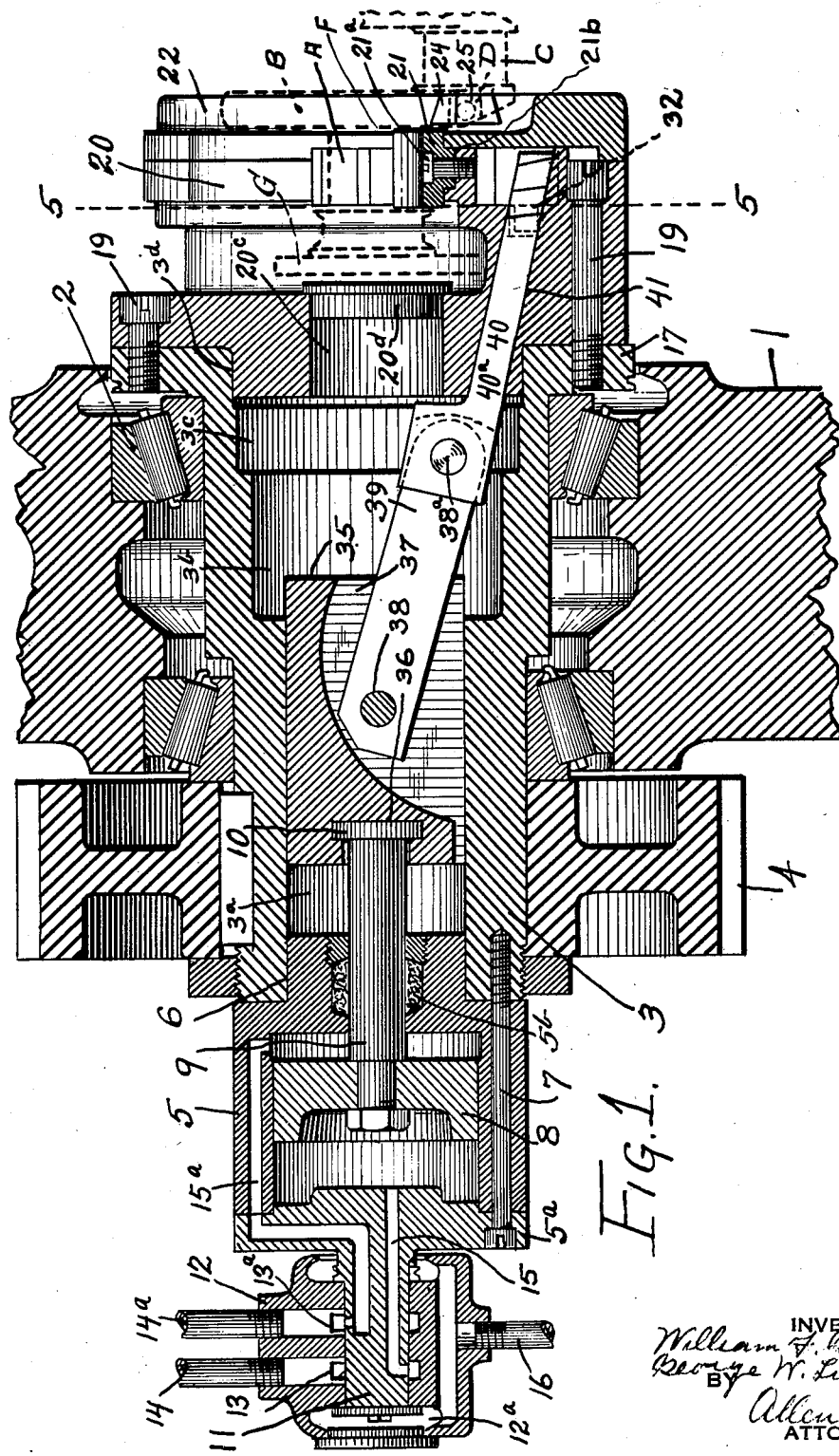

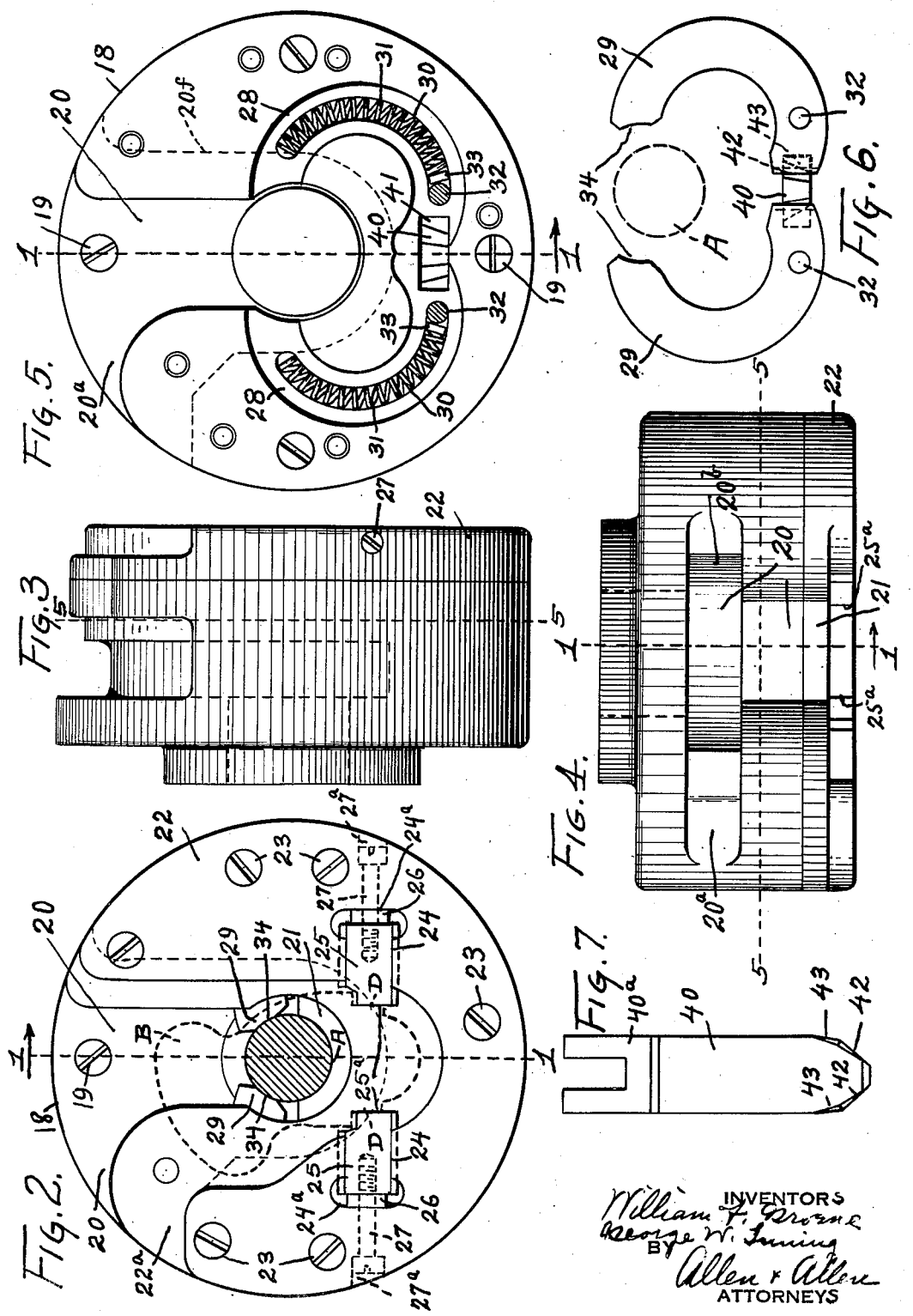

2,030,142

UNITED STATES PATENT OFFICE 2,030,142

CHUCK

William F. Groene and George W. Luning, Cincinnati, Ohio, assignors to The R. K. Le Blond Machine Tool Company, Cincinnati, Ohio, a corporation of Delaware Application December 10, 1934, Serial No. 756,727

15 Claims. (Cl. 82—40)

Our invention relates to machine tool construction, and more especially to chucks for lathes or like machine tools. Our invention is more particularly concerned with the machining of objects in which the part to be machined is off center of the axis of rotation of the object; a familiar example being automotive crank shafts, which have the crank pins and adjacent cheeks machined while rotating the shaft on the axis of its line bearings.

Previously, the centering of the axis of such objects has been effected by the aid of center pins located on the axis of turning of the work holding devices or chucks.. This, as is well known in the machine tool art, involves accurate location and formation of center depressions in the ends of the object, usually conical depressions. The lathe centers are also conical, but usually at a wider angle than the depressions. This involves careful work; and it is not well adapted for securely holding the work under the peculiar stresses and strains set up during orbital turning of the crank pins. Also this method does not give accurate and dependable lengthwise location of the work under such circumstances, due to the sliding contact between the work and the center pin, causing wear and lengthwise looseness or movement of the work, especially during the machining of the cheeks of the webs.

It is an object of our invention to avoid the care and slow procedure necessary, in setting the work for the turning of the off center parts, or crank pins of the crank shaft, for instance.

Our invention is applicable, for example, to lathes of the types disclosed and claimed in Patents No. 1,934,530, issued November 7, 1933, and No. 1,938,696 issued December 12, 1933. It will be understood, however, that our invention is applicable to any machine tool wherein the operating conditions make advantageous the use of our invention.

In pursuance of the above stated object, it is our further object to provide for accurate centering by engagement with lateral cylindrical surfaces of a crank shaft.

A further object is to provide for accurate lengthwise location of the crank shaft, by engagement with adjacent cheeks of one or more of the line bearings of the crank shaft, or equivalent portions of any work similar thereto in its requirements.

A further object is to make use of locating faces on parts of the piece of work, as upon the webs of the crank shaft, after the manner set forth and claimed in reissue applications Serial No. 744,565, filed September 18, 1934, and Serial No. 748,720, filed October 17, 1934; for rigidly holding the work in exact index and angular alinement in relation to the orbital paths of the turning tools during the turning operation.

A further object is to provide a pair of chucks to grip a crankshaft or equivalent work piece near the ends thereof, so that all portions, eccentric to the axis of rotation of said work piece and adjacent faces extending radially to said portions may be turned simultaneously, the chucks serving to locate the work on the proper axis of rotation and in proper indexed position relative to the chucks and orbitally moving tools, at least one of the chucks having means definitely and automatically to position the work lengthwise of the axis of rotation of the chucks and work piece.

A further object is to make use of such a method of holding the work, as a part of the centering operation, in conjunction with and with the cooperation of means bearing on the cylindrical surface of the work as before mentioned, and with suitable clamping means which, when the work is rigidly gripped, leaves the work truly centered with respect to the cylindrical portion of the work thus engaged.

A further object is to provide the clamping means just mentioned, of such construction and mode of operation that it may be very quickly operated; and preferably to operate such clamping means by fluid pressure, both as to clamping and unclamping, whereby a very powerful gripping of the work is afforded, together with a very quick clamping and unclamping action.

It is a further object to provide for the above objects by a construction which will be fully practicable of installation and operation in conjunction with other adjuncts of the machine tool, such as, for instance, are disclosed in the prior patents above mentioned. For the application of the hydraulic pressure, we may make use of means for conducting the liquid from a non-rotary source to the rotary holding means or chuck, as for example, the kind disclosed and claimed in the copending application, Serial No. 687,447, of myself and Harold J. Siekmann, filed August 30, 1933. Such means is herein set forth, but we are not to be understood as being limited to its use.

Further objects will appear in the course of the following description, illustrated by the drawings, in which—

Figure 1 is a vertical longitudinal section of an embodiment of our invention, together with such other parts of a machine tool as are necessary to illustrate the same, the section being on the line 1—1 of Figs. 2, 4 and 5.

Figure 2 is a front elevation of the chuck.

Figure 3 is a side elevation of the same.

Figure 4 is a plan view of the same.

Figure 5 is a front elevation of the same with the front plate removed, better to show interior details, the clamp jaws also being removed, but their pins being in section on the line 5—5 of Fig. 1.

Figure 6 is a detail front elevation of the clamp jaws and their operating cam bar, in open position, the work to be clamped being indicated by dotted lines.

Figure 7 is a detail plan view of the clamp jaw operating cam bar.

As illustrated, our invention will be understood to be included in a lathe structure, the spindle housing 1 of which is shown in Fig. 1, with roller bearings 2 for the hollow lathe spindle 3 having keyed on it at the rear of the housing 1 a driving gear 4, understood to mesh with other gearing of the lathe, to rotate the spindle 3. The major rear interior of the spindle 3 is a cylindrical bore 3a, while the front part has its bore enlarged as at 3b and 3c, with an additional short enlargement 3d at its front end.

The fluid-pressure cylinder 5 has a reduced front end portion 6 fitting in the rear end of the spindle bore 3a, with an annular shoulder closely abutting the rear end of the spindle; and screws 7, passing through the rear end head 5a of the cylinder and through the cylinder itself, secure the head to the cylinder and both to the spindle, so that the spindle rotates the cylinder with it. A piston or plunger 8 slides snugly in the cylinder, with a rod 9 passing through a packing box 5b into the spindle bore 3a, where this rod 9 terminates in a circular head 10.

In order to transmit the fluid under pressure from the source of pressure not shown, to the rotating cylinder 5 while the source and the transmission pipes are fixed, a connection head is provided at the rear of the cylinder 5, which has a tapered rear extension centrally of it, at 11, around which fits the casing 12 in fluid-tight relation thereto, with annular ports 13 and 13a surrounding this extension 11 and communicating, respectively, with the inlet pipe 14 and the exhaust pipe 14a that lead into one side of the casing. Inside this extension 11 are ports 15 and 15a, communicating out through the sides of the extension with the annular ports 13 and 13a, respectively. Port 15 leads to the rear end of the cylinder interior; and port 15a leads to the front end thereof, ahead of the piston or plunger 8. The casing 12 has an interior space 12a surrounding its portions that fit the extension 11, to catch leakage which may be inevitable under the high pressure of the fluid; and at the bottom of this space 12a a drain pipe 16 leads out and down, to carry away the leakage. This construction, as before mentioned, is disclosed in the copending application, and claimed therein. It will be understood that admission and discharge of the fluid are controlled by suitable valve means in connection with the pipes 14 and 14a; which means, not being of controlling import herein, is not illustrated or described.

The front end of the spindle 3 has an outwardly extended annular flange 17, to which the chuck body 18 is held by screws 19; the body having a reduced portion that fits in the front end enlargement 3d of the spindle interior. The major front portion of the chuck body 18 is made roughly U-shaped by a slot 20 radial thereto and of such width as to readily admit the chucked portion of the work from the periphery of the body to a central position therein. The radially outer end part of this slot 20 is widened, as at 20a, preferably, to provide an easy entrance of the work to the slot 20. The rear portion of this roughly U-shaped part of the body is deepened and widened in substantial conformity with the slot 20, forming a pocket 20b to receive an enlarged end part of the work piece. Central opening 20c leads back from this pocket for access to the interior of the spindle 5, and is closed by a plug 20d.

The inner termination of the slot 20 conforms to the major part of a circle concentric with the spindle 3; and fitted in the innermost part of this termination is a bushing piece 21, nearly of half-circular extent as here shown; being held in place by screws 21a, and also having an annular tennon 21b fitting a segmental groove in the middle of the termination, as seen in Fig. 1. This bushing piece is made of hardened steel, highly resistive to wear, and being removable, may be replaced by a truly accurate piece when worn so much as to impair its accuracy; the requirements being that its inner surface be truly cylindrical on a radius whereby it will receive the portion of the work piece accurately and hold the work piece truly concentric with the lathe spindle; and that the semicircular end faces of this locating bushing piece be so spaced apart as to exactly fit between the cheeks adjacent to the line bearing of the work so as to definitely position the shaft in lengthwise location.

The chuck body 18 has secured to it, by screws 23, a front or face plate 22 with a radial slot conforming to the slot 20 of the body, and having in its front a wider recess 22a. Extending out from opposite sides of the part of the recess 22a that is radially past the inner termination of the slot 20 are dovetail guideways 24, in the face plate 22. Lateral locating blocks 25 slide snugly in these guideways to present their inner end faces 25a toward each other at opposite sides of the diameter of the chuck that is median to the arcuate bushing piece 21, before described. At the outer ends of the guideways 24 are slots 24a, longer than the width of these guideways, leaving spaces at the outer ends of the locating blocks 25; which spaces receive respective spacing pieces 26, each with an opening through it. Tapped bores in the outer end parts of the respective locating blocks 25 register with the openings in the spacing pieces; and screws 27, entering through the periphery of the face plate 22, with their heads abutting the bottoms of counterbores 27a in the periphery, have their inner end parts extended through the spacing piece openings and threaded into the tapped bores of the locating blocks.

The blocks and spacing pieces are made of hardened steel, and the outer walls of the slots 24a being accurately finished, the thickness of the spacing pieces accurately determines the distance between the inner end faces 25a of the lateral locating blocks 25 when these are clamped tightly by the screws 27 with the spacing pieces 26 between them and the walls of the slots 24a. By interchanging spacing pieces, the locating blocks 25 may be varied in their spacing to fit work of different widths, in their locating and indexing function to be later described.

The front face of the chuck body 18, which is covered by the front or face plate 22, as is fully shown in Fig. 5, has two arcuate slots 28, each somewhat more than semicircular in extent, with ends meeting on the median diameter through the bushing piece 21, opposite the slot 20 along this diameter, and with their opposite ends opening into the slot 20 somewhat out along the slot 20 from the center of the chuck. Arcuate clamp jaws 29, shown in Fig. 6, fit snugly in the respective slots 28. Narrower arcuate slots 30 are formed in the bottoms of the jaw receiving slots 28, concentric with and median to the latter slots; and each narrower slot 30 contains a compression spring 31 bent around to conform thereto with one end abutting the end of the narrow slot 30 next to the open end of the jaw receiving slot 28. Each arcuate jaw 29 has fixed in it a pin 32 that extends into the opposite end part of the respective narrow slot 30, with a flat filler block 33 interposed between the pin and the adjacent end of the spring 31 to form a good bearing for the spring. The springs 31 thus tend to retract the arcuate jaws 29 around away from the ends of the slots 28 that open into the work receiving slot 20 of the chuck body 18. The ends of these jaws 29 at these open ends of the slots 28 are made concave, as at 34, Fig. 6, to fit the work, represented at A. It will be understood that these ends 34 are hardened to resist wear; although accuracy here is not as essential as it is at the bushing piece 21, the locating block ends 25a, and the spacing pieces 26.

The connection block 35, cylindrical, has a snug sliding fit in the major rear portion 3a of the spindle bore. In its rear end it has a T-slot 36 which receives the head 10 of the front end of the piston rod 9, before described; so that reciprocation of the plunger or piston 8 causes like movement of this block 35. This block 35 has a slot 37 to which a plane of the diameter of the block is median; the slot 37 opening out through the front of the block and through the major portion of one side thereof at the side of the chuck axis at which the arcuate slots 28 meet as before described, and at which the arcuate jaws therein have ends facing. A pin 38 is fitted in the connection block 35, across the slot 37, forming a pivot for one end of the link 39. The operating cam bar 40 slides in a guideway 41 slanting from the rear outwardly from the chuck axis, so that the front end part of this cam bar enters between said ends of the arcuate jaws 29, while the enlarged rear end part 40a of the cam bar occupies the enlarged front part of the spindle bore. This rear end part 40a is bifurcated and straddles the front end part of the link 39, and a pivot pin 38a passes through its members and the link. Sliding of the block 35 by the plunger 8 thus slides the cam bar 40 forwardly and rearwardly. The rear corners of the adjacent ends of the arcuate clamping jaws 29 are beveled to bear on the sides of the front end part of the cam bar 40.

These sides of the bar 40 are shaped as best seen in Fig. 7. Beginning slightly to one side of the middle of the front end of the bar, there is a bevel of about 45 deg., followed by a shorter bevel of about 15 deg., at each side of the bar, as at 42 and 43, respectively. The first bevels 42, entering between the jaw ends, force the jaws rapidly apart, to engage the work with their opposite ends 34; and then the more moderate bevels 43 cause a final very powerful clamping of the jaws 29 against the work at A, Fig. 6; forcing the work against the centering bushing piece 21, while the lateral locating blocks 25 index and locate the work angularly about its axis, by being set to the exact spacing of their faces 25a to snugly receive the accurately performed contact faces of the work, previously mentioned. This also prevents angular shifting of the work in the chuck.

Thus, as seen in Figs. 1 and 2, the crank shaft has the end line bearing A in bushing piece 21, and the web B, connecting the line bearing A to the crank pin C that is to be turned, has on its web the faces D, formed by milling or like operation. The web B is accommodated in the recess 22a of the front of the face plate 22, into which the web B extends to abut its machined cheek F against the end of arcuate bushing piece 21, and the pocket 20b of the chuck body 18 accommodates the flange G of the work.

The crank shaft, having had its line bearings, including bearing A at each end, and the adjacent cheeks F, truly machined by usual methods, and having had milled or otherwise formed thereon the locating faces D, is passed into the chucks. It will be understood that there is one of our chucks for each end of the shaft. The shaft is passed through the slots 20 and registering face plate slot, until its portion A rests in the hardened centering bushing piece 21, at each end. This centers the crank shaft with the chucks. In one of the chucks, usually the flange end one, bushing piece 21 fits snugly between the adjacent cheeks F of the line bearing B, while clearance is allowed between this bushing piece 21 and the line bearing cheeks in the other chuck. This automatically exactly locates the work lengthwise without delicate adjustment or binding of the work.

Fluid now being admitted through pipe 14, the plunger acts to force the cam bar 40 forwardly, spreading the arcuate jaws 29 and causing them to bear firmly on the shaft parts A, rigidly holding the shaft centered in the bushing pieces 21, truly centered and ready for turning. It will be understood that for turning the crank pins C of the shaft, the lathe is of the kind imparting orbital movement to the cutting tools, examples of which will be found in the prior art patents hereinbefore mentioned. For taking out the work, or unchucking, after it is finished, admission of fluid to the other pipe 14a forces the plunger rearwardly and withdraws the cam bar 40, allowing the jaws 29 to recede from the work under the action of the springs 30, which were compressed when the jaws 29 were forced against the work, in chucking. The work now may be simply withdrawn from the chucks through their radial slots 20.

The continuous arcuate centering bushing piece 21 is preferable, although it will be understood that surfaces less than the inner surface of said piece in extent, if sufficiently spaced around the work piece part A, will serve the purpose. These might not even be concave to fit the part A; but of course the wear, and loss of accuracy of centering, would much more quickly occur. This also may be said of the ends 34 of the jaws 29, if made other than concave to fit the work part A; but in this case wear will not result in loss of accuracy of centering, as the jaws will be forced as far as need be. The accuracy here is more dependent upon the retention of the symmetrical shape of the end part of the cam bar 40, to force the jaws 29 equally; but any slight inaccuracy in that respect is found not to defeat the purpose, because the locating blocks 25 cooperate with the means at 21 for insuring correct seating and centering of the work on this means 21. It will be understood also, that this bushing piece 21, or its equivalent, being removable, may be replaced by a different sized piece or its equivalent, for chucking a work part of size different from that of the part A.

Modifications other than those mentioned herein may occur, and it will be understood that we are not limited to the precise construction or uses herein shown, but what we claim as new and desire to secure by Letters Patent is:

1. In a chuck, means presenting surfaces equidistant from the chuck axis at one side thereof, to receive a cylindrical part of a work piece and hold it coaxial with the chuck, said chuck having arcuate guides at opposite sides of said means, arcuate jaws guided in said guides, each to present an end to an area of the cylindrical part of the work, which areas are spaced apart along a line beyond the axis of the chuck from said surfaces, a single cam means acting against the opposite ends of both of said jaws to force them against said part of the work, and means on said chuck to engage another part of the work to cause the work piece to rotate with the chuck.

2. A chuck as set forth in claim 1, in which the arcuate guides have arcuate recesses, and including springs in said recesses, and projections on said jaws engaging said springs to compress them when the jaws are forced against the work, said springs acting to withdraw the jaws from the work as the jaws are relieved of the action of the cam means.

3. A chuck as set forth in claim 1, in which the cam member is guided at an inclination to the axis of the chuck, and including means operating along the axis of the chuck for causing said cam means to act on the jaws or to relieve the jaws of the action of the cam.

4. A chuck as set forth in claim 1, which is made up of a body and a face plate secured to the body, the arcuate guides being in the part of the body next to the face plate, and the arcuate jaws being held in said guides by said face plate.

5. In a chuck having an entrance space from its periphery toward its center, terminating in a work-receiving space around said center, means equidistant from the center at spaced positions along a line at one side of the center, to engage a cylindrical part of a work piece and hold it coaxial with the chuck, means to clamp said part to the aforesaid means, said chuck having in its face a recess with its sides facing toward the chuck axis and having guides therein, locating blocks slidable in the respective guides to present ends facing each other across the recess, between which another part of the work piece may be held securely when the work piece is placed in the chuck along said entrance space, and means for effecting fixed adjustment of said locating blocks in said guides.

6. A chuck as set forth in claim 5, in which the means for adjusting the locating blocks comprises spacing pieces between the opposite ends of the respective blocks and adjacent parts of the chuck, and screws threaded into the respective locating blocks and drawing them against the respective spacing pieces, whereby the locating blocks, clamping the spacing pieces against said parts of the chuck, are held rigidly in their adjusted positions.

7. In a chuck having an entrance space from its periphery toward its center, terminating in a work-receiving space around the center, work-surface-engaging centering means at the inner end of said receiving space, arcuately guided clamping means to engage the work surface beyond the center from the centering means, and means to straddle another part of the work, beyond said centering means from the center said straddling means having fixed locating surfaces for engaging a work piece.

8. A chuck as set forth in claim 5, in which the straddling means is adjustable and adapted to be fixed when adjusted to straddle the said part of the work or a wider or narrower corresponding part of another piece of work.

9. A chuck as set forth in claim 7, which has a hollow spindle, and means operatable inside the spindle and having a single operative extension in engagement with the clamping means, to force the clamping means into engagement with the said work surface, or to relieve the clamping means from said engagement.

10. A chuck as set forth in claim 7, in which the clamping means comprises movable jaws with parts to be engaged beyond the center of the chuck from the entrance space, the chuck having a hollow spindle and including a cam member guided along a line slanting away from the chuck axis to and engaging said jaw parts to move the jaws into engagement with the said work surface, and power means operating along the spindle axis and operatively connected to said cam member inside the spindle, to operate said cam member for action on said jaws as aforesaid.

11. In a chuck having an entrance space from its periphery toward its center, terminating in a work-receiving space around the center, means receiving a cylindrical part of a work piece as it enters said receiving space from said entrance space, and engaging peripherally spaced areas of said part to center it with the chuck, means on the chuck to cause the work piece to rotate with the chuck, and power-operated clamping means to clamp said part of the work piece to the means that centers said part, comprising jaws mounted on the chuck to move parts into clamping engagement with the work piece incident to movement of other parts of said jaws away from each other, a cam member guided on the chuck to enter between and move apart said other parts of said jaws, or to recede and permit the jaws to unclamp the work piece, said chuck having a hollow spindle, a fluid-pressure cylinder and plunger rotating with the spindle, an operative connection from the plunger to the cam member, inside the hollow spindle, and means to apply fluid under pressure to one or another side of said plunger, including a connection which permits rotation of the spindle and chuck relative to the source of supply of fluid pressure.

12. A chuck as set forth in claim 11, in which the power-operated clamping means comprises jaws movable on the chuck, each to engage a part with the work piece part while another part of each jaw is moved away from the corresponding part of the other jaw, and a cam member having diverging surfaces engaging said other parts of the jaws to wedge them apart, said surfaces having an initial high angle of divergence succeeded by a lower angle of divergence.

13. The method of chucking a crank shaft for machining a cylindrical portion and adjacent face of a web of the shaft, which comprises finishing an area of the shaft which lies intermediate the diametrical end limits of the web, to present a locating face in the direction of the length of the web, in a definite relation to a proper axis of said cylindrical portion, finishing the radially extending faces adjacent to the said area, in a definite axial position of the crank shaft, finishing areas of opposite sides of the web which are limited in extent to minor portions of the sides of the web, to present locating faces oppositely outward transversely of the web in a definite relation to said proper axis, irrespective of the shape of the major portion of the web, and supporting the thus partially finished shaft in a suitable chucking device by definitely located abutment means of the device presenting abutment areas to the respective finished areas of the shaft, which abutment areas correspond in disposition and limited extent to the disposition and extent of the respective finished areas of the shaft.

14. The method of chucking a crank shaft for machining cylindrical portions and adjacent faces of webs of the shaft, by engagement with angularly aligned webs of the shaft spaced longitudinally thereof, which comprises finishing areas of the shaft which lie intermediate of the diametrical end limits of the web, to present locating faces in the general direction of the lengths of the webs, in a definite relation to a proper axis of each cylindrical portion, finishing the radially extending faces adjacent to at least one of said areas, in a definite axial position of the crank shaft, finishing minor areas of the opposite sides of the respective webs in a definite relation to each other and to said proper axis of each cylindrical portion, irrespective of the shapes of the major portions of the webs, and supporting the thus partially finished shaft in suitable synchronously rotatable chuck bodies by definitely located abutment means of the bodies presenting areas to the respective finished areas of the shaft, which abutment means correspond in disposition and limited extent to the dispositions and extent of the respective finished areas of the shaft.

15. The method of chucking a crank shaft for machining cylindrical portions and adjacent faces of webs of the shaft which comprises providing a pair of synchronously rotatable chucks, gripping the crank shaft in said chucks by means of finished areas of the shaft which lie intermediate of the diametrical end limits of the terminal webs and projecting axially outward therefrom, said locating faces being in a definite relation to a proper axis of each cylindrical portion, locating said crank shaft in the chucks by abutment means coacting with finished minor areas of the opposite sides of the terminal webs, said minor areas being located in a definite relation to each other and to said proper axis of each cylindrical portion, and locating said crank shaft in definite axial position by providing locating means in at least one of the chucks coacting with the adjacent radially extended faces of at least one of the first mentioned finished areas, said chucking means serving to automatically simultaneously locate the crank shaft in proper centered, indexed, and axial position.

WILLIAM F. GROENE.
GEORGE W. LUNING.